United States Patent Office 3,441,667
Patented Apr. 29, 1969

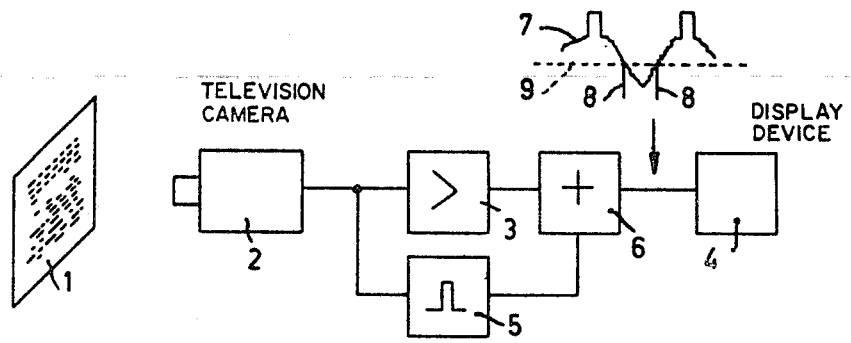
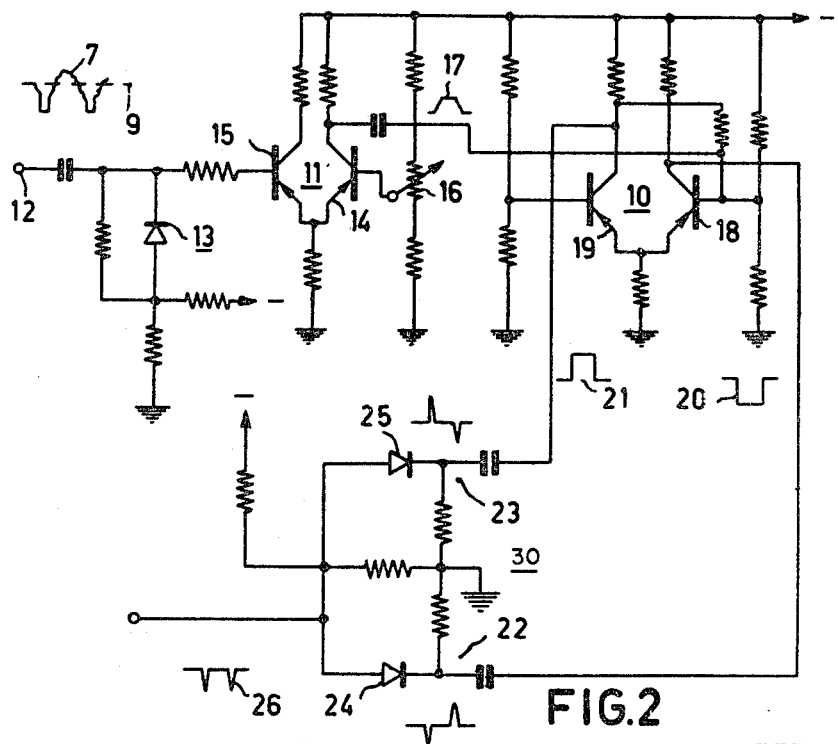

3,441,667
RADIOGRAPHIC DISPLAY DEVICE WITH AREAS OF INTEREST SET OFF WITH MARKING PULSES
Tom Novacek, Vienna, Austria, assignor, by mesne assignments, to U.S. Philips Corporation, New York, N.Y., a corporation of Delaware
Filed July 26, 1965, Ser. No. 474,558
Claims priority, application Austria, July 29, 1964, A 6,510/64
Int. Cl. H04l 15/00; H03k 3/04, 1/00
U.S. Cl. 178—6.8     5 Claims

ABSTRACT OF THE DISCLOSURE

A device for providing an accurate display of selected areas of a radiation characteristic includes a camera for providing a signal indicative of observed radiation level, a thresholding device responsive to the signal for producing a marker pulse each time the radiation measured by the signal passed through the predetermined threshold, a summing device for combining both signals and pulses, and a display tube for displaying both signals and pulses on a coincident time base.

---

This invention relates to radiological techniques and particularly to a device for televising an area of radiation with emphasis on particular areas of radiological interest.

In standard X-ray or radiological examinations, particularly in the medical field, it is commonplace practice to produce a graphic illustration indicative of the measurable presence of radiological information for the benefit of subsequent reference or study. Where isotopic examination is utilized in medical analysis, charts of the various radioactive concentration levels at particular points throughout the subject being examined are of invaluable assistance in proper diagnostic formulation.

Charts or radiographs of the class described may be formed in many ways. For example, a scintillation counter may be passed over the subject in a series of closely spaced parallel scan lines. The counter signal is compiled by a dash, punch, or other indicating type of pulse printing device for registering the radiation intensity on a moving strip chart or the like. The frequency of the markings on the chart is an indication of the intensity of the radiation. The dash printer may be replaced by a small lamp which gives a light flash upon each pulse from the counter and blackens a photographic layer. Alternatively, a scintillation camera device could also be used, operating on the pin-hole principle, which can directly provide a photograph of the radiation division without scanning mechanically.

It has been found however, that the plotting of a radiograph from the radiological intensity data accumulated as above, is a laborious and time consuming operation. In the dash or punch printer for example, it becomes necessary to account for the individual dashes or holes per unit length to realize an indication of the measure of intensity. With photographic indicators, a photometric detecting network is required to measure the relative blackening of the curve to gather information as to intensity.

Accordingly, it is a prime object of the invention to provide a novel and a unique apparatus for the effective plotting of a radiation characteristic in a simple and straightforward manner.

It is a further object of the invention to provide a device for plotting a radiograph with special emphasis on levels of radiation above a predetermined concentration.

It is a still further object of the invention to form a radiographic image on a convenient display mechanism.

These and further objects of the invention will appear as the specification progresses and will be pointed out in the claims and illustrated in the accompanying drawing which disclose, by way of example, the principle of the invention and the best mode contemplated of applying that principle.

In accordance with the underlying principle of our invention, radiological data is presented in dash printed or other conveniently utilizable format and scanned sequentially by light or other similar radiation sensitive vidicon or television camera device. A varying electrical signal representative of the frequency or intensity of the radiation level being scanned is thereby generated, amplified and displayed on a television or similar type of display screen. At the same time, the electrical signal generated by the scanning device is introduced into a pulse marking thresholding device which is preset at a desired minimum triggering level. When the radiation level runs above the predetermined minimum level, a momentary pulse is generated by the marking device. When the radiation level falls back below the minimum level, a second pulse is generated. These pulses are fed into a summing device where they are combined with the amplified signal from the scanning device. Both signals are then displayed on the screen simultaneously, with areas of radiation concentration above a minimum level clearly indicated at the beginning and end of the emphasized interval by means of the marking pulses.

The invention will now be described in greater detail with reference to the accompanying drawing wherein:

FIGURE 1 illustrates a block diagram of the scanning and display system in accordance with one embodiment of the invention.

FIGURE 2 shows a detail of the preferred circuitry which may be employed as the marking pulse generator of FIGURE 1.

Referring now to FIGURE 1 a sheet, containing radiological data is scanned by a vidicon detector similar type of television camera 2 in a parallel linear sequential pattern and the resulting video signal passed through a stage of amplification 3 for eventual display on a cathode ray tube television circuit or other type of visual display device 4. The video signal originating in the detector 2 is further supplied to a marking pulse generator or triggering circuit 5, which will respond to a rise in the video input signal above a predetermined minimum level to produce a marking pulse of short duration. A second pulse is produced when the level of the video input signal falls below the minimum predetermined level. Since the video signal is proportional to the scanned radiation intensity, the marking pulses serve to provide a boundary indication of the duration of a radiation level above the predetermined minimum.

The resultant marking pulses are combined with the original video signal in a summation circuit 6 and both signals are simultaneously displayed on the screen of display device 4. The screen therefore will now provide a graphic illustration of the pattern of radiation concentration being measured as well as demarking the beginning and end of the duration of excessive measured radiation concentration. The amplitude of the marking pulses is chosen to be such that it is clearly distinguishable from the remaining image information. The pulses may be of either positive or negative polarity so that the radiation intensity to be characterized is shown as bright or dark image points on the screen.

The signal applied to the display unit 4 by the summation circuit 6 is illustrated graphically by a curve 7 in FIGURE 1. The marking pulses which occur at times 8 occur in the summed signal at the selected threshold level 9, as indicated. In placing the marking signals onto the display device, it is noted that the summation circuit 6 is only one possible mode of operation. The marking pulses may well be introduced directly to the dislay device, as for example onto the control grid of a display tube. Further, a plurality of trigger circuits, each having differing threshold levels, could be employed whereby a plurality of different radiation intensities of interest could be displayed simultaneously. Similarly, the amplitude of the pulses can be adjusted so that differing contrast levels relative to the image information could be displayed. Other modifications and variations will be apparent to those skilled in the art without departing from the scope and spirit of the invention.

Referring to FIGURE 2, an embodiment of the trigger circuit 5 of FIGURE 1 is illustrated, comprising a clamping circuit 13, a differential amplifier 11, a bistable triggering circuit 10, and a dual differentiating network 30.

The input 12 of the trigger circuit receives a video input signal 7 which is fixed at a predetermined bias potential by means of the clamping circuit 13. The signal is then introduced to a differential amplifying network 11, comprising a pnp type transistor 15, emitter coupled to a second pnp type transistor 14. Transistor 15 is normally conducting, and transistor 14 is normally cut-off in the absence of an input signal. The base bias of transistor 14 may be set at a predetermined threshold level by means of a potentiometer 16, thereby fixing the minimum input signal level at which transistor 14 will be rendered conducting and transistor 15 non-conducting. An output signal 17 from the differential amplifier 11 is capacitively coupled to a bistable triggering circuit 10, which may for example be arranged as a Schmitt trigger, and which, under no input conditions, comprises a normally conducting transistor 18 and a normally non-conducting transistor 19. The bias voltage present at the base of the transistor 18 determines the level at which the transistors of the bistable trigger changes states. This bias voltage is chosen in accordance with the desired triggering level and in relation to the relative magnitude of the amplitude of the signal 17. When the selected threshold level 9 is exceeded, a pulse 20 with a negative excursion and a pulse 21 with a positive excursion appear at the respective collectors of transistors 18 and 19. The change of state of trigger 10 is maintained for as long a period as the signal input thereto is above the predetermined threshold level 9. When the signal drops below the threshold, the trigger 10 returns to its normal state.

The pulses 20 and 21 are differentiated in the differentiating circuit 30 by the respective differentiators 22 and 23. The diodes 24 and 25 are positioned at the output of each differentiator so that only the negative portion of each pulse is passed, and the resultant marking pulses 26 are passed therethrough. The signal 26, as previously described, is added to the video signal 7 in summing circuit 6 for display.

By reversing the connections of the diodes 24 and 25, only positive pulses will be passed. This reversing of connections may, if desired, be effected by means of a commutator or other switching device so that positive or negative marking pulse signals may be obtained at will.

It will be understood that the above described triggering circuit is exemplary only and that other types of triggered bistable circuits are utilizable in accordance with the present invention. For example, a negative resistance device such as a tunnel diode could similarly be utilized. It is necessary however, that the arrangement be relatively stable so that the switching will always take place at the same threshold signal level.

It will be further understood that the display device may be designed to operate as a maximal persistance display, that is, the decay rate of the phosphorescent material coating the cathode ray tube would have a decay rate of sufficient length to allow a plurality of scans to be superimposed, resulting in what would effectively be a simultaneous or coincident time base display. In this manner, the information could be introduced to the display tube on a first scan while the marking pulses therefor are introduced on the next scan. The persistance characteristic of the display tube face would allow both waveforms to be visible simultaneously.

By the above described method and exemplary apparatus, it is seen that data may be gleaned from a given radiation spectrum in a simple, straightforward and rapid manner. The radiograph plotted is visible on the display screen together with the marks and can be made a permanent record by well known photographic techniques. Further, the radiation concentration selected is readily variable by means of a single control 16 thereby affording greater flexibility in display. The electrical signal may be derived directly from mechanically scanning a scintillation counter, however, synchronization with a cathode ray tube in the display device would be necessary in such a case, as would the need to increase display tube luminescent qualities to compensate for the inherently slower scanning speed in a mechanical scan.

While we have described our invention in connection with specific embodiments and applications thereof, other modifications will be apparent to those skilled in the art without departing from the spirit and scope of the invention as defined in the appended claims.

I claim:

1. The method of displaying a radiation image with emphasis on a selected radiation concentration level comprising the steps of: scanning an area of radiological information for generating a video signal representative of said radiological information; detecting the presence of a radioactive concentration equal to or greater than said selected concentration, generating a first indicating marker pulse when said detected radioactive concentration rises above said selected concentration; generating a second indicating marker pulse when said detected radioactive concentration falls below said selected radioactive concentration; and combining and displaying said video signal and said first and second marker pulses on a coincident time basis.

2. A device for displaying a radiation image with emphasis on a selected radiation concentration level, comprising a radiation sensitive scanning device for generating a video signal having a variation proportional to the relative variation in concentration to the radiation being scanned, a triggerable pulse generating means connected to said scanning device, said pulse generating means having therein threshold responsive means responsive to said video signal received from said scanning device and triggering said pulse generating means for generating a marker pulse each time said video signal passes through a preselected level, said level determined by said threshold means, and display means connected to said scanning device and said pulse generating means for simultaneously displaying said video signal and said generated pulse from said pulse generating means.

3. A device for displaying a radiation image with emphasis on a selected radiation concentration level portion thereof, comprising a radiation sensitive scanning device for generating a video signal proportional to the variation in relative concentration of the radiation being scanned, pulse generating means connected to said scanning device, said pulse generating means having therein a biased potentiometrically adjustable threshold responsive means for triggering said pulse generating means for generating a pulse upon receipt from said scanning device of a magnitude of said video signal passing through a preselected level, said level determined by the potentiometrically adjustable bias setting on said threshold means, and display means connected to said scanning device and said pulse generating means for simultaneously displaying said video signal and generated pulses from said pulse generating means.

4. A device for displaying a radiation image with emphasis on a selected radiation concentration level portion thereof, comprising a radiation sensitive scanning device for generating a video signal proportional to the relative concentration of the radiation being scanned, amplifying means connected to said scanning device for amplifying said video signal, pulse generating means connected to said scanning device, said pulse generating means having therein a biased threshold responsive means for triggering said pulse generating means each time the said video signal received from said scanning device passes through a preselected level, said pulse generating means producing a pulse of relatively short duration in response to each triggering of said pulse generating means, said level determined by the bias setting on said threshold means, summing means connected to said amplifying means and said pulse generating means for combining said video signal and generated pulses into a single signal, and display means for displaying said signals, said generated pulses being limited in duration sufficiently to prevent said pulse from altering the display of any portion of said radiation proportional signal.

5. The combination of claim 4 wherein said scanning device comprises a vidicon detector and said display means comprises a television display circuit.

References Cited

UNITED STATES PATENTS

| | | | |
|---|---|---|---|
| 2,851,522 | 9/1958 | Hollywood | 178—7.3 |
| 3,005,045 | 10/1961 | Shanahan | 178—6.8 |
| 3,214,515 | 10/1965 | Eberline | 178—6.8 |

ROBERT L. GRIFFIN, *Primary Examiner.*

RICHARD K. ECKERTS, JR., *Assistant Examiner.*

U.S. Cl. X.R.

328—59; 315—22